(12) United States Patent
Moon et al.

(10) Patent No.: US 10,235,410 B2
(45) Date of Patent: Mar. 19, 2019

(54) QUERY INPUT APPARATUS AND METHOD

(71) Applicant: Electronics and Telecommunications Research Institute, Daejeon (KR)

(72) Inventors: Jin-Young Moon, Daejeon (KR);
Kyu-Chang Kang, Daejeon (KR);
Yong-Jin Kwon, Daejeon (KR);
Kyoung Park, Daejeon (KR);
Chang-Seok Bae, Daejeon (KR);
Jeun-Woo Lee, Gyeryong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 477 days.

(21) Appl. No.: 15/041,769

(22) Filed: Feb. 11, 2016

(65) Prior Publication Data

US 2016/0232202 A1 Aug. 11, 2016

(30) Foreign Application Priority Data

Feb. 11, 2015 (KR) .......................... 10-2015-0021215

(51) Int. Cl.
*G06F 17/30* (2006.01)
*G06F 3/0484* (2013.01)
*G06F 3/0486* (2013.01)
*G06F 8/34* (2018.01)

(52) U.S. Cl.
CPC ...... *G06F 17/30398* (2013.01); *G06F 3/0486* (2013.01); *G06F 3/04842* (2013.01); *G06F 8/34* (2013.01); *G06F 17/3056* (2013.01); *G06F 17/30522* (2013.01)

(58) Field of Classification Search
CPC .................................................. G06F 17/30398
USPC .......................................................... 707/779
See application file for complete search history.

(56) References Cited

U.S. PATENT DOCUMENTS

| | | | |
|---|---|---|---|
| 6,819,797 | B1 | 11/2004 | Smith et al. |
| 8,271,573 | B2 | 9/2012 | Song et al. |
| 8,577,919 | B2 | 11/2013 | Seo et al. |
| 8,805,067 | B2 | 8/2014 | Lee et al. |
| 2007/0282884 | A1* | 12/2007 | Son .................. H04N 21/41407 |
| 2010/0070527 | A1* | 3/2010 | Chen ................. G06F 17/30781 707/772 |
| 2014/0294360 | A1 | 10/2014 | Raptis et al. |

FOREIGN PATENT DOCUMENTS

| | | |
|---|---|---|
| EP | 1067786 A1 | 1/2001 |
| EP | 1067786 B1 | 3/2011 |
| KR | 10-0961444 B1 | 6/2010 |
| KR | 10-1090763 B1 | 12/2011 |
| KR | 10-2013-0098769 A | 9/2013 |
| WO | 2005/052805 A1 | 6/2005 |
| WO | 2008/130182 A1 | 10/2008 |

* cited by examiner

*Primary Examiner* — Joshua Bullock
(74) *Attorney, Agent, or Firm* — Rabin & Berdo, P.C.

(57) ABSTRACT

Disclosed herein are a query input apparatus and method. The query input apparatus includes: an input unit providing a graphic user interface (GUI) to receive a schematized composite activity that a user wants to search from the user; and a processing unit generating a query using an activity descriptor corresponding to the schematized composite activity depending on a query request from an activity searching system and transferring the generated query to the activity searching system.

11 Claims, 8 Drawing Sheets

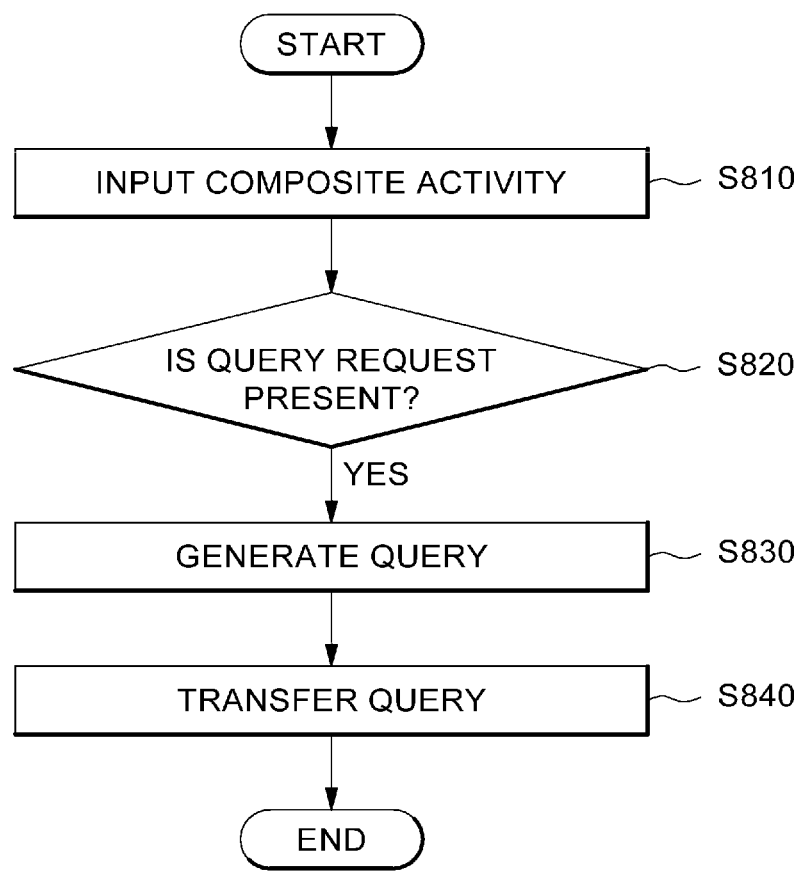

QUERY INPUT APPARATUS AND METHOD

CROSS REFERENCE TO RELATED APPLICATION

This application claims the benefit of Korean Patent Application No. 10-2015-0021215, filed on Feb. 11, 2015, entitled "Apparatus and Method for Query Input", which is hereby incorporated by reference in its entirety into this application.

BACKGROUND OF THE INVENTION

1. Technical Field

The present invention relates to a query input apparatus and method.

2. Description of the Related Art

An activity searching system in an existing video has provided three methods as a query input method for allowing a user to search a specific event. A first method is a method in which the activity searching system receives an image or video clip including a target activity to be searched and searches a video section in which an activity similar to the activity included in the received image or video clip occurs, a second method is a method in which the activity searching system receives an explanation for persons or objects related to an activity and activities of the persons or the objects as a natural language based text or audio from the user and searches a video section in which a related activity occurs on the basis of the received explanation, and a third method is a method in which the user drags related objects and an icon meaning activities of the objects through a graphic user interface and schematizing the related objects and the icon in an editor, and the activity searching system searches a video section in which an activity described by the schematized diagram occurs.

However, since the existing activity search represents only one action, the activity may be searched by the three methods described above. However, the three methods described above are not appropriate as a query input method for searching a composite activity configured of a plurality of actions. First, in the case of the first method of providing an example of the target activity to be searched as the image or video clip, when the activity is configured of a combination of a plurality of actions to become complicated, it is difficult to represent the activity as a single image or video clip. Second, in the case of explaining the persons or the objects and the activities of the persons or the objects on the basis of a natural language, it is easy to represent associated objects or persons, but it is not easy to accurately describe a relation of a time section between configuration actions configuring the activity. Third, in the case of a method of describing the related objects and a single action between the objects through the graphic user interface and querying a logical relation between actions in AND and OR forms simply using logical symbols such as AND, OR, and the like, only a logical relation of whether all of configuration actions are present (AND) or any one of the configuration actions is present (OR) is considered, such that relations between time intervals between the actions may not be represented.

Therefore, a new query input apparatus and method appropriate for searching a composite activity having relations between time intervals between configuration actions have been required.

SUMMARY OF THE INVENTION

An object of the present invention is to provide a query input apparatus and method capable of generating an input query allowing an active searching system to search a composite activity by describing relations between time intervals between actions configuring the composite activity.

According to an aspect of the present invention, there is provided a query input apparatus. The query input apparatus includes: an input unit providing a graphic user interface (GUI) to receive a schematized composite activity that a user wants to search from the user; and a processing unit generating a query using an activity descriptor corresponding to the schematized composite activity depending on a query request from an activity searching system and transferring the generated query to the activity searching system.

The graphic user interface may include: an edition main region in which a composite activity edited by the user is displayed; a template selecting region providing templates indicating relations between time intervals between actions; and an action selecting region providing the actions configuring the relations between time intervals.

The action selecting region may provide actions calculated through keyword search or actions basically suggested.

The composite activity may be generated by allowing the user to select a template and an action and drag the selected template and action into the edition main region using drag and drop.

The graphic user interface may further include a logic gate selecting region providing logic gates, and a plurality of composite activities may be combined with each other using the logic gate.

The input unit may include: an inquiring module providing a function of inquiring actions and activities so that the user configures the activities; an editing module providing a function of editing the activities on the basis of templates indicating relations between time intervals; and a combining module providing a function of combining the activities with each other using a logic gate.

The processing unit may include: a descriptor managing module managing the activity descriptor representing the schematized composite activity; and a query generating module converting the activity descriptor corresponding to the schematized composite activity into the query and transferring the query to the activity searching system.

The query input apparatus may further include a database storing activity information, action information, or relation between time intervals information.

According to another aspect of the present invention, there is provided a query input method performed by a query input apparatus.

The query input method includes: providing a graphic user interface (GUI) to receive a schematized composite activity that a user wants to search from the user; and generating a query using an activity descriptor corresponding to the schematized composite activity depending on a query request from an activity searching system; and transferring the generated query to the activity searching system.

The graphic user interface may include: an edition main region in which a composite activity edited by the user is displayed; a template selecting region providing templates indicating relations between time intervals between actions;

and an action selecting region providing the actions configuring the relations between time intervals.

The action selecting region may provide actions calculated through keyword search or actions basically suggested.

The composite activity may be generated by allowing the user to select a template and an action and drag the selected template and action into the edition main region using drag and drop.

The graphic user interface may further include a logic gate selecting region providing logic gates, and a plurality of composite activities may be combined with each other using the logic gate.

BRIEF DESCRIPTION OF THE DRAWINGS

FIG. 8 is a flow chart illustrating a query input method in the query input apparatus of FIG. 1.

DESCRIPTION OF THE EXEMPLARY EMBODIMENTS

Figure 1:
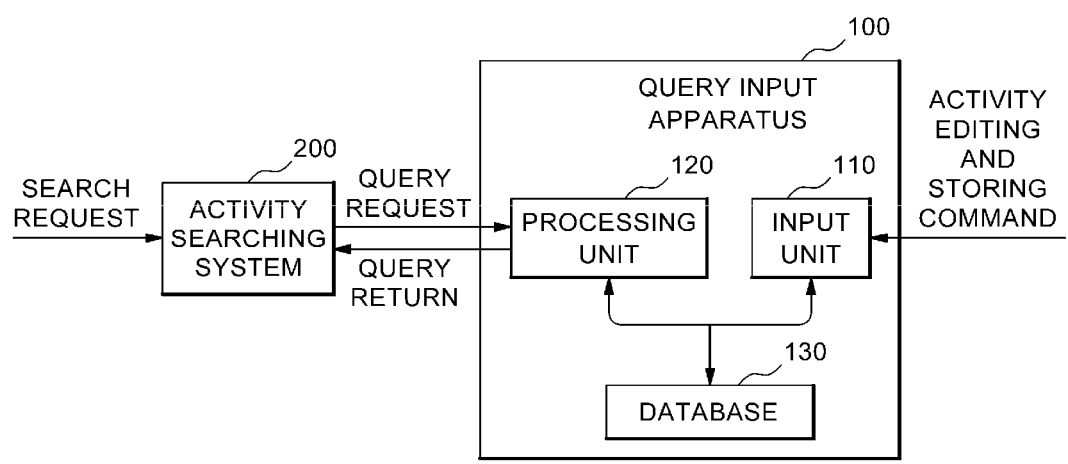
FIG. 1 is a view schematically illustrating components of a query input apparatus.

The present invention may be variously modified and have several exemplary embodiments. Therefore, specific exemplary embodiments of the present invention will be illustrated in the accompanying drawings and be described in detail in the present specification. However, it is to be understood that the present invention is not limited to a specific exemplary embodiment, but includes all modifications, equivalents, and substitutions without departing from the scope and spirit of the present invention.

When it is decided that the detailed description of the known art related to the present invention may unnecessary obscure the gist of the present invention, a detailed description therefor will be omitted. In addition, numerals used in an explanation process of the present specification are only reference numerals for distinguishing one component from another component.

Further, in the present specification, it is to be understood that when one component is referred to as "connected to another component", one component may be directly connected to another component or may be connected to another component through any other components unless explicitly described to the contrary.

Hereinafter, exemplary embodiments of the present invention will be described in detail with reference to the accompanying drawings. The same means will be denoted by the same reference numerals throughout the accompanying drawings in order to facilitate the general understanding of the present invention in describing the present invention.

Figure 2:
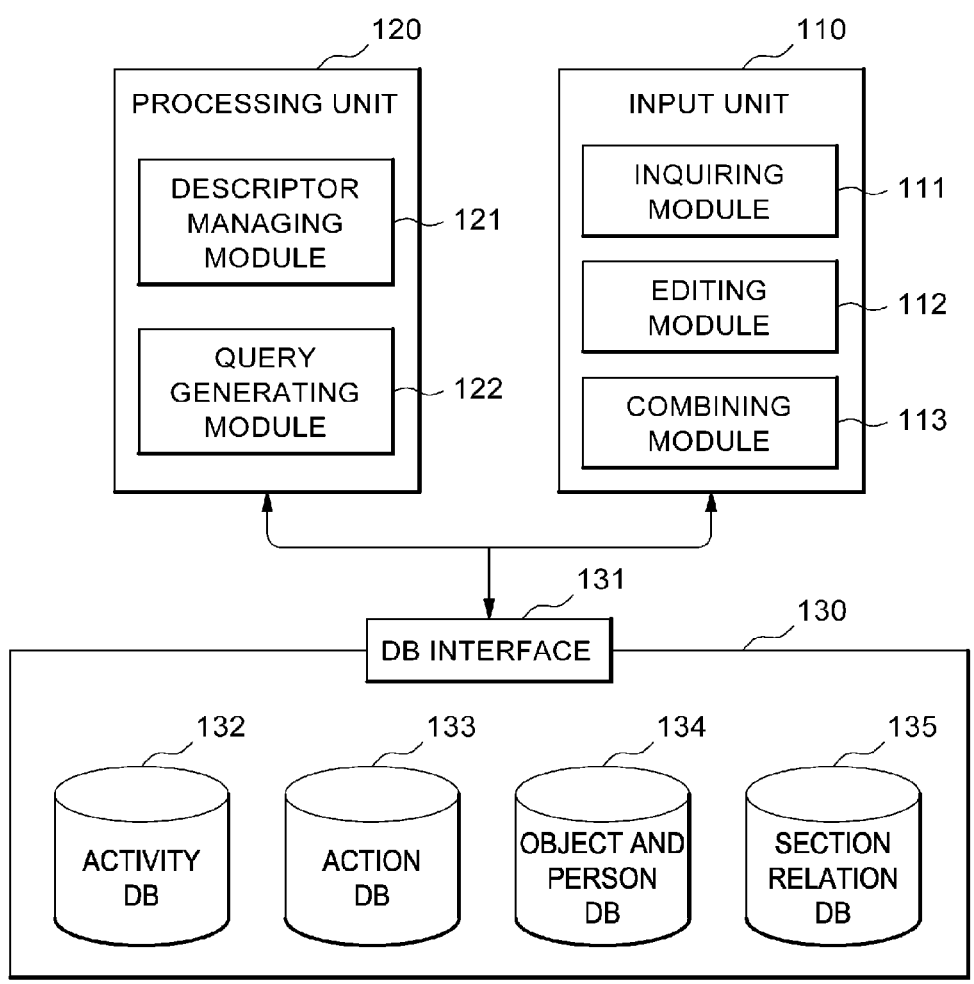
FIG. 2 is a view illustrating the respective components of the query input apparatus of FIG. 1 in detail.

FIG. 1 is a view schematically illustrating components of a query input apparatus, and FIG. 2 is a view illustrating the respective components of the query input apparatus of FIG. 1 in detail.

Referring to FIG. 1, the query input apparatus 100 includes an input unit 110, a processing unit 120, and a database 130.

The input unit 110 provides a graphic user interface (GUI) to receive a composite activity that a user wants to search in a schematized form from the user. Here, the composite activity is generated by composing component actions using relations between time intervals. The graphic user interface through which the user may describe the composite activity will be described below with reference to FIGS. 3 to 7.

Referring to FIG. 2, the input unit 110 includes an inquiring module 111, an editing module 112, and a combining module 113.

The inquiring module 111 provides a function of inquiring actions and activities so that the user configures the activities.

The editing module 112 provides a function of editing the activities on the basis of templates indicating relations between time intervals.

The combining module 113 provides a function of combining the activities with each other using a logic gate.

The processing unit 120 generates a query using an activity descriptor corresponding to the schematized composite activity depending on a query request from an activity searching system 200, and transfers the generated query to the activity searching system 200. Referring to FIG. 2, the processing unit 120 includes a descriptor managing module 121 and a query generating module 122.

The descriptor managing module 121 manages the activity descriptor representing the schematized composite activity. For example, when an activity storing command is input from the user, the descriptor managing module 121 may store an edited composite activity in an activity database (DB) 132 through a DB interface 131.

The query generating module 122 converts the activity descriptor corresponding to the schematized composite activity into the query, and transfers the query to the activity searching system 200.

The database 130 stores activity information, action information, relation between time intervals information, object and person information, and the like, therein. For example, referring to FIG. 2, the database 130 includes the DB interface 131, the activity DB 132, an action DB 133, an object and person DB 134, and a relation between time intervals DB 135. The DB interface 131 serves as an interface when the input unit 110 and processing unit 120 access the activity DB 132, the action DB 133, the object and person DB 134, and the relation between time intervals DB 135.

Figure 3:
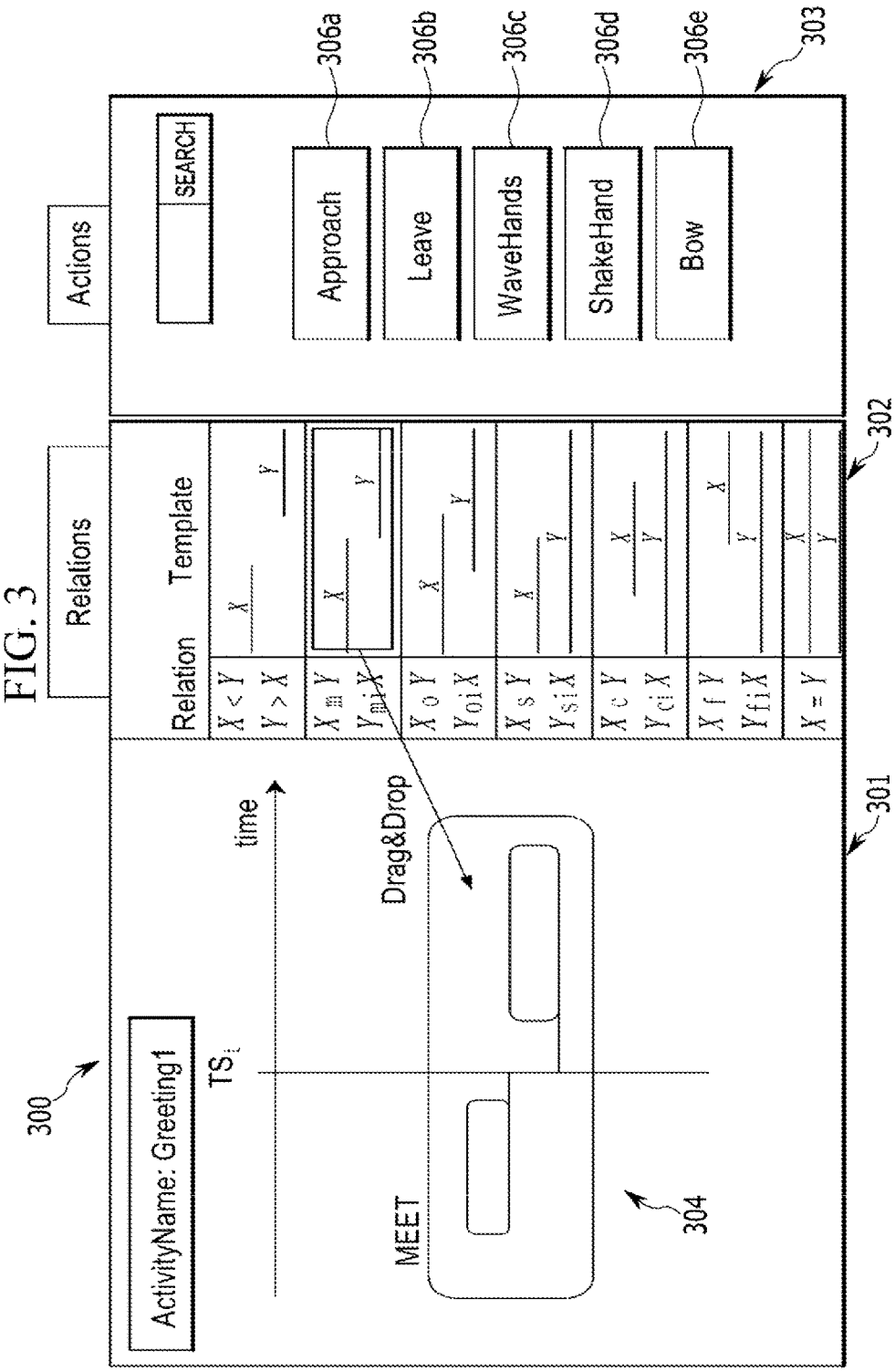
FIG. 3 is a view illustrating a configuration of a graphic user interface.

FIG. 3 is a view illustrating a configuration of a graphic user interface. The graphic user interface provides a function of allowing the user to combine actions with each other depending on relations between time intervals to describe an activity.

Referring to FIG. 3, the graphic user interface may include an edition main region 301, a template selecting region 302, and an action selecting region 303. The edition main region 301 is a region in which the composite activity 304 edited by the user is displayed. The template selecting region 302 provides templates indicating relations between time intervals between actions, and the action selecting region 303 provides the actions 306a-306e configuring the relations between time intervals. The action selecting region 303 may provide actions 306a-306e calculated through keyword search or actions basically suggested previously.

For example, the relations between time intervals may include PROCEDE (X<Y), MEETS (X m Y), OVERLAPS (X o Y), FINISHES (X f Y), CONTAINS (X c Y), STARTS (X s Y), DURING (X d Y), occurs simultaneously with (X=Y), and the like, and may include PROCEDED_BY (Y>X), MET_BY (Y mi X), OVERLAPED_BY (Y of X), FINISHED_BY (Y fi X), CONTAINED_BY (Y ci X), STARTED_BY (Y si X), and the like, which are the respective inverse relations.

For example, when the user drags a template indicating a desired relation between time intervals into the edition main region 301 using drag and drop, the corresponding template may be generated in the edition main region 301. In addition, when the user drags actions configuring the relation between time intervals into the edition main region 301 using drag and drop, the composite activity may be described in the edition main region 301.

Figure 4:
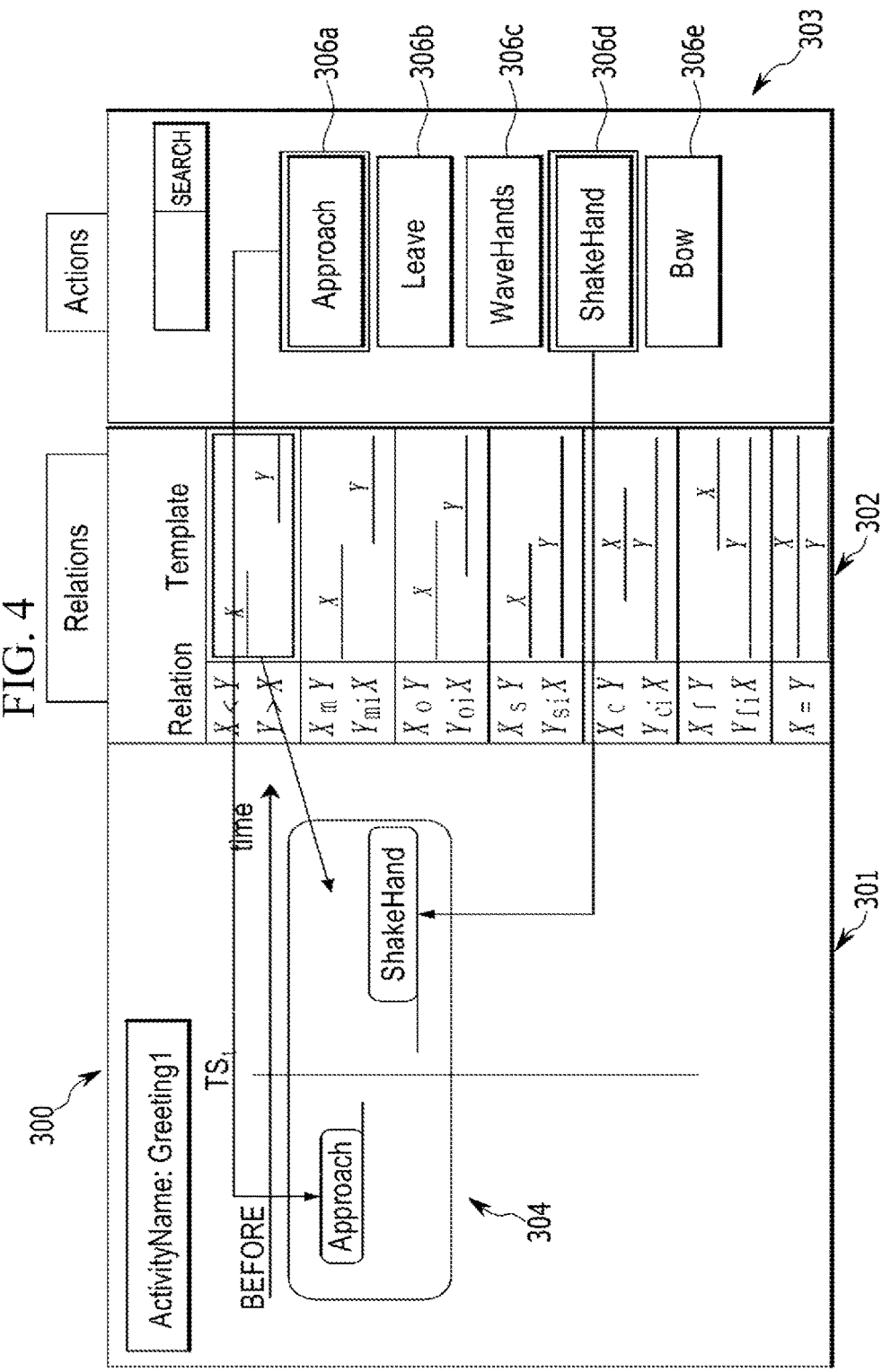
FIGS. 4 to 7 are views illustrating an example of describing a composite activity.

FIGS. 4 to 7 are views illustrating an example of describing a composite activity. Referring to FIG. 4, FIG. 4 is an example of describing a composite activity Greeting1 using a BEFORE relation among the relations between time intervals. That is, as illustrated in FIG. 4, when the user drags the BEFORE relation (X<Y) among the relations between time intervals into the edition main region 301 and drags each of Approach 306a and ShakeHand 306d actions into the edition main region 301, the composite activity Greeting1 configured of two actions in which two persons approach each other and shake hands with each other may be described.

Figure 5:
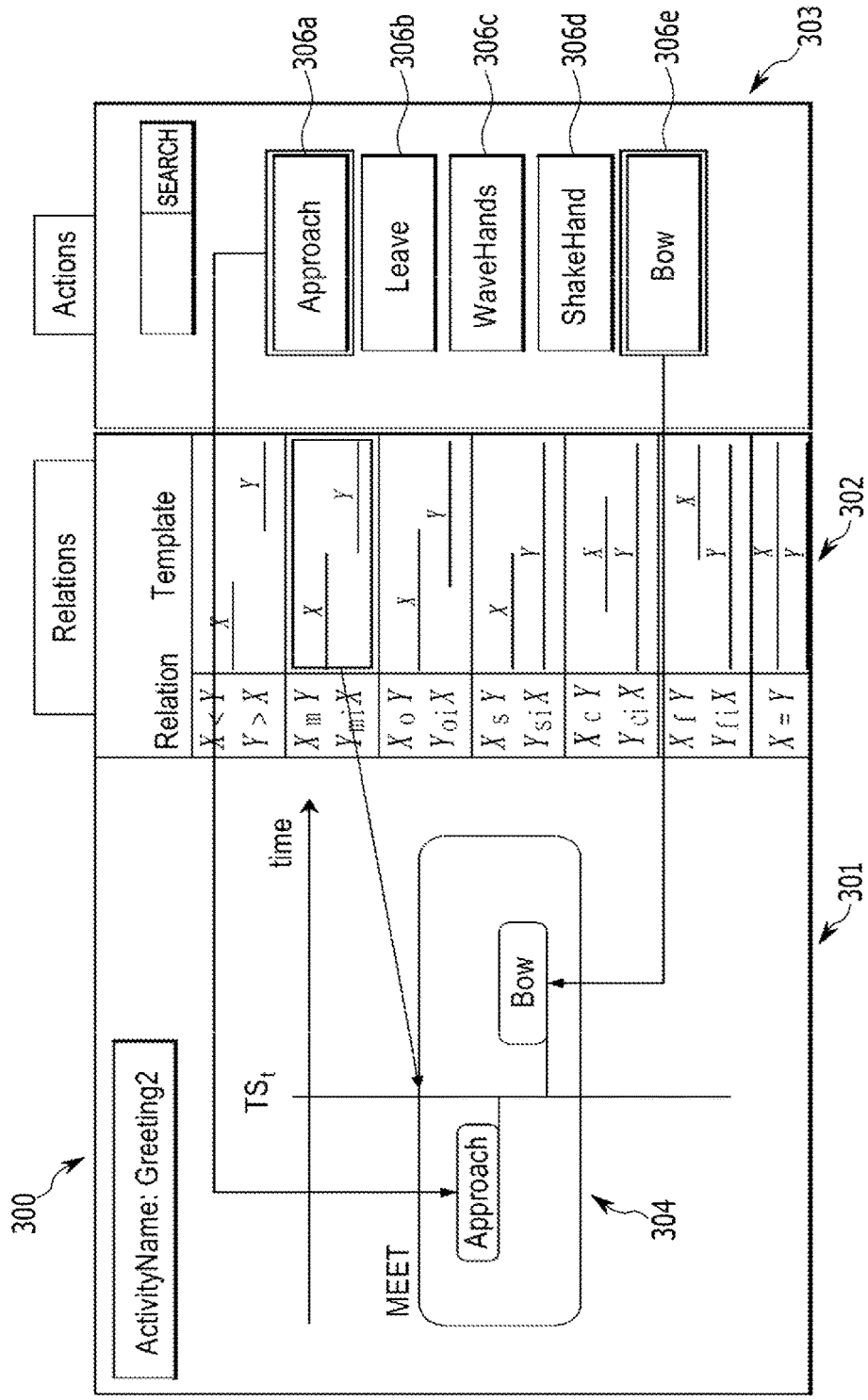

Referring to FIG. 5, FIG. 5 is an example of describing a composite activity Greeting2 using a MEET relation among the relations between time intervals. That is, as illustrated in FIG. 5, when the user drags the MEET relation among the relations between time intervals into the edition main region 301 and drags each of Approach and WaveHands actions into the edition main region 301, the composite activity Greeting2 configured of two actions in which two persons approach each other and then bow to each other may be described.

Figure 6:
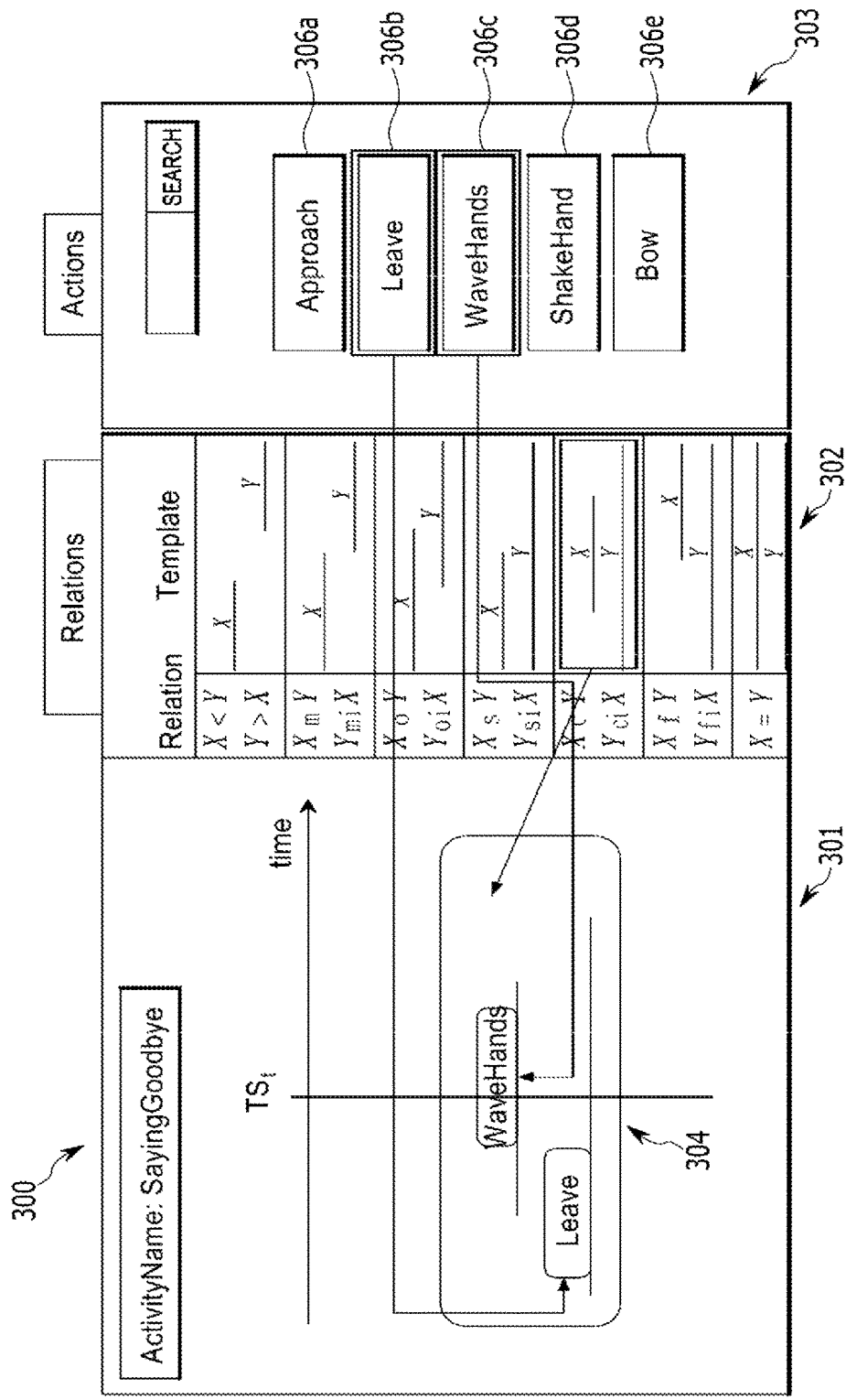

Referring to FIG. 6, FIG. 6 is an example of describing a composite activity SayingGoodbye using a DURING relation among the relations between time intervals. That is, as illustrated in FIG. 6, when the user drags the DURING relation among the relations between time intervals into the edition main region 301 and drags Leave as an outer action and WaveHands as an inner action into the edition main region 301, the composite activity SayingGoodbye configured of two actions in which two persons wave their hands during a period in which they become distant may be described.

Figure 7:
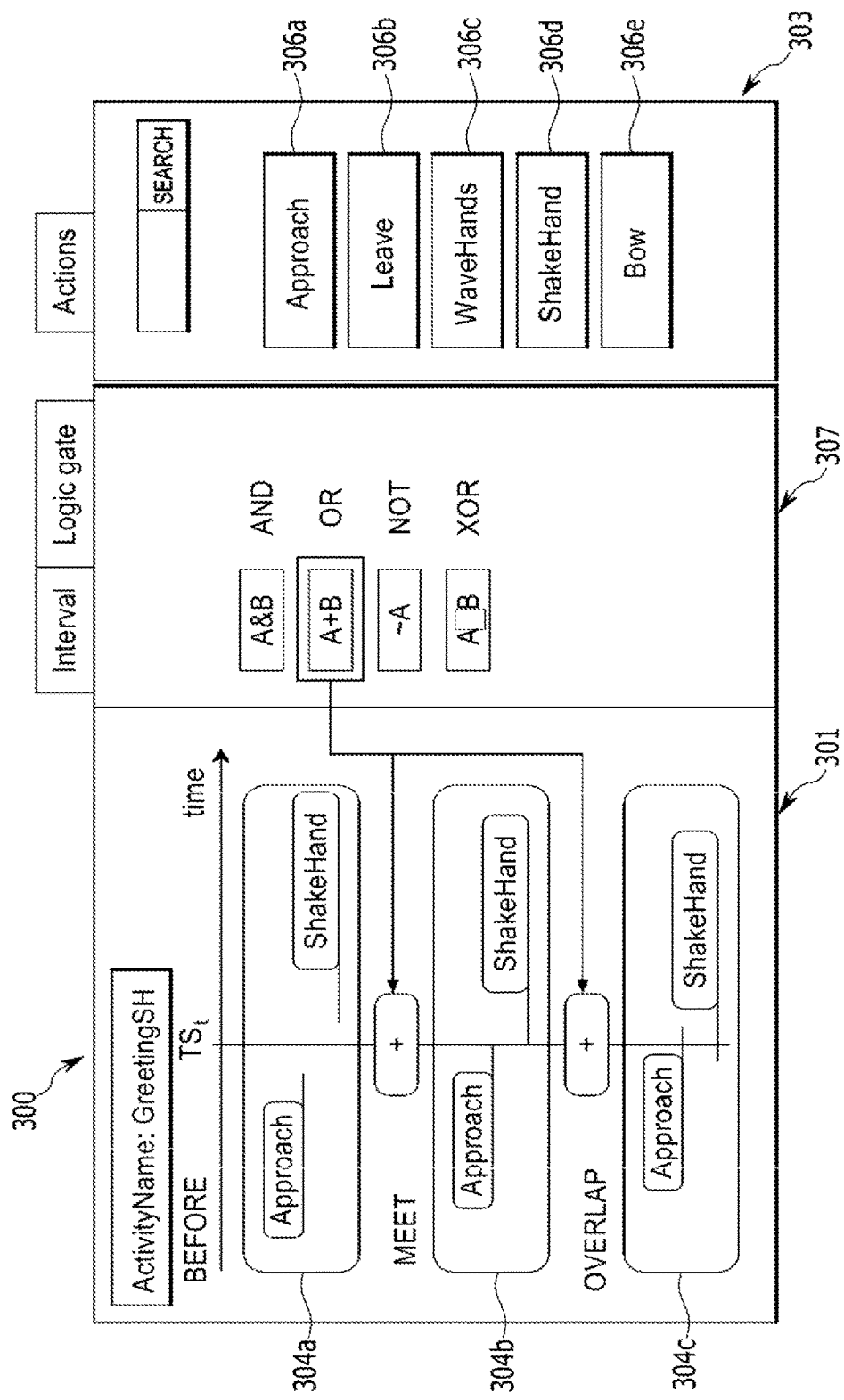

Referring to FIG. 7, FIG. 7 is an example of describing a composite activity by combining the respective composite activities with each other by logic gates such as AND, OR, NOT, XOR, and the like. That is, as illustrated in FIG. 7, the graphic user interface 300 may further include a logic gate selecting region 307 providing the logic gates. In the case in which relations between Approach and ShakeHand actions are BEFORE, MEET, and OVERLAP relations, all of them may be defined as a Greeting event. Therefore, when the user connects three composite activities 304a, 304b, and 304c using each of three sections to each other by dragging an OR gate, a composite activity GreetingSH including all of the three sections may be described.

FIG. 8 is a flow chart illustrating a query input method in the query input apparatus of FIG. 1.

In 5810, the query input apparatus 100 provides the graphic user interface to receive the composite activity that the user wants to search in the schematized form from the user.

In 5820, the query input apparatus 100 decides whether or not the query request from the activity searching system 200 is present.

In 5830, the query input apparatus 100 generates the query using the activity descriptor corresponding to the schematized composite activity in the case in which the query request from the activity searching system 200 is present.

In 5840, the query input apparatus 100 transfers the generated query to the activity searching system 200.

Meanwhile, the query input method according to an exemplary embodiment of the present invention may be implemented in a form of program commands that may be executed through various means capable of electronically processing information, and may be recorded in a storage medium. The storage medium may include program commands, data files, data structures, or the like, alone or a combination thereof.

The program commands recorded in the storage medium may be especially designed and constituted for the present invention or be known to those skilled in a software field. Examples of the storage medium include a magnetic medium such as a hard disk, a floppy disk, and a magnetic tape; an optical recording medium such as a compact disk read only memory (CD-ROM) and a digital versatile disk (DVD); a magneto-optical medium such as a floptical disk; and a hardware device specially configured to store and perform program commands, such as a ROM, a random access memory (RAM), a flash memory, or the like. In addition, the above-mentioned medium may also be a transmission medium such as light including a carrier transmitting a signal specifying a program command, a data structure, or the like, a metal line, a waveguide, or the like. Examples of the program commands include a high-level language code capable of being executed by an apparatus electronically processing information using an interpreter, or the like, for example, a computer, as well as a machine language code made by a compiler.

The above-mentioned hardware device may be constituted to be operated as one or more software modules in order to perform an operation according to the present invention, and vice versa.

According to the present invention, it is possible to generate an input query allowing an active searching system to search a composite activity by describing relations between time intervals between actions configuring the composite activity.

Although exemplary embodiments of the present invention have been disclosed hereinabove, it may be understood by those skilled in the art that the present invention may be variously modified and altered without departing from the scope and spirit of the present invention described in the following claims.

What is claimed is:

1. A query input apparatus comprising:
an input unit providing a graphic user interface (GUI) to receive, from a user, a schematized composite activity which is used by the user to perform a search, wherein the schematized composite activity includes a plurality of actions defined by the user and at least one temporal relationship between the plurality of actions, and the at least one temporal relationship defined by the user; and
a processing unit generating a query using an activity descriptor corresponding to the schematized composite activity depending on a query request from an activity searching system and transferring the generated query to the activity searching system,
wherein the graphic user interface includes:
an edition main region in which the schematized composite activity defined by the user is displayed;

a template selecting region providing templates indicating relations between time intervals between actions, the templates selectable by the user to be displayed in the edition main region to define the at least one temporal relationship between the plurality of actions; and an action selecting region providing the actions selectable by the user to be displayed in the edition main menu to define the plurality of actions.

2. The query input apparatus of claim 1, wherein the action selecting region provides actions calculated through keyword search.

3. The query input apparatus of claim 1, wherein the composite activity is generated by allowing the user to select a template from the template selecting region and an action from the action selecting region, and drag the selected template and action into the edition main region using drag and drop.

4. The query input apparatus of claim 1, wherein the graphic user interface further includes a logic gate selecting region providing logic gates, and a plurality of composite activities are combined with each other using the logic gate.

5. The query input apparatus of claim 1, wherein the input unit includes:

an inquiring module providing a function of inquiring actions and activities so that the user configures the activities;

an editing module providing a function of editing the activities on the basis of templates indicating relations between time intervals; and a combining module providing a function of combining the activities with each other using a logic gate.

6. The query input apparatus of claim 1, wherein the processing unit includes:

a descriptor managing module managing the activity descriptor representing the schematized composite activity; and a query generating module converting the activity descriptor corresponding to the schematized composite activity into the query and transferring the query to the activity searching system.

7. The query input apparatus of claim 1, further comprising a database storing activity information, action information, or relation between time intervals information for times.

8. A query input method performed by a query input apparatus, comprising:

providing a graphic user interface (GUI) to receive a schematized composite activity which is used by the user to perform a search, wherein the schematized composite activity includes a plurality of actions defined by the user and at least one temporal relationship between the plurality of actions, and the at least one temporal relationship defined by the user;

generating a query using an activity descriptor corresponding to the schematized composite activity depending on a query request from an activity searching system; and transferring the generated query to the activity searching system, wherein the graphic user interface includes:

an edition main region in which the schematized composite activity defined by the user is displayed;

a template selecting region providing templates indicating relations between time intervals between actions, the templates selectable by the user to be displayed in the edition main region to define the at least one temporal relationship between the plurality of actions; and an action selecting region providing the actions selectable by the user to be displayed in the edition main menu to define the plurality of actions.

9. The query input method of claim 8, wherein the action selecting region provides actions calculated through a keyword search.

10. The query input method of claim 8, wherein the composite activity is generated by allowing the user to select the temporal relationship with a template from among the templates and the first and second actions from among the actions, and to drag the selected template and first and second actions into the edition main region using drag and drop.

11. The query input method of claim 8, wherein the graphic user interface further includes a logic gate selecting region providing logic gates, and a plurality of composite activities are combined with each other using the logic gate.

* * * * *